UNITED STATES PATENT OFFICE.

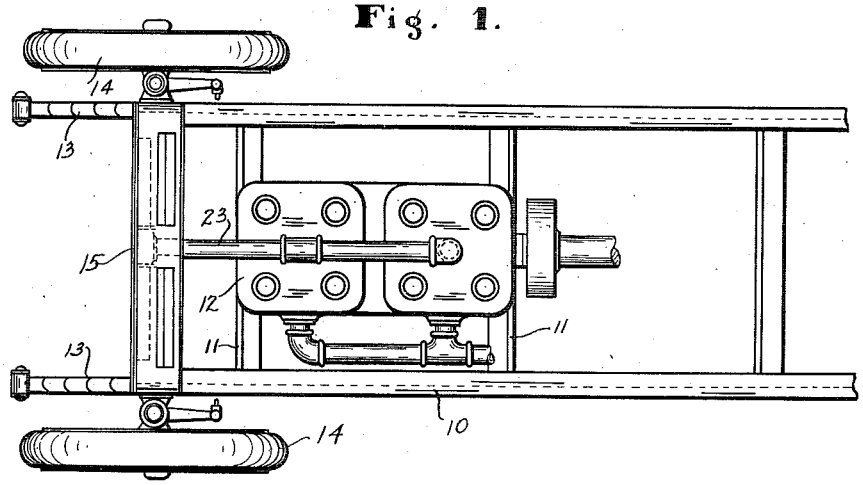

FRANK CONLY, OF INDIANAPOLIS, AND WILLIAM A. HAWKINS, OF CARMEL, INDIANA.

WATER-COOLER.

1,005,809.          Specification of Letters Patent.      Patented Oct. 17, 1911.

Application filed March 6, 1911. Serial No. 612,556.

*To all whom it may concern:*

Be it known that we, FRANK CONLY and WILLIAM A. HAWKINS, citizens of the United States, and residents of Indianapolis and Carmel, counties of Marion and Hamilton, respectively, and State of Indiana, have invented a certain useful Water-Cooler; and we do hereby declare that the following is a full, clear, and exact description thereof, reference being had to the accompanying drawings.

The object of this invention is to provide improved cooling means for engines.

The nature of the invention will be understood from the accompanying drawings and the following descriptions and claims.

In the drawings Figure 1 is a plan view of the forward portion of the chassis of an automobile and cooling apparatus. Fig. 2 is a front elevation of the water cooler. Fig. 3 is a section on the line 3—3 of Fig. 2 through the water cooling apparatus. Fig. 4 is a detail showing a portion of the front wall of the water cooler on a large scale. Fig. 5 is a perspective rear view of the front wall of the water cooler. Fig. 6 is a section through a portion of the water cooler extending horizontally in a transverse direction, and obliquely in a longitudinal direction, as shown by the line 6—6 of Fig. 3.

In detail there is shown herein for the purpose of explaining the general nature of our invention, a frame 10 for the chassis of an automobile having cross-bars 11 carrying an engine 12 provided with the usual water jacket construction.

13 are the springs, 14 the front wheels, and over the front axle (not shown) the water cooler is located.

The construction of all parts mentioned above, excepting the water cooler, are of the usual construction and, in fact, may be of any desired construction.

The water cooler consists of a chamber disposed vertically and transversely of the machine, having a rear wall 20 and a front wall 21 with a collecting chamber 22. At the upper end, a pipe 23 leads from the water jacket of the engine to the upper end of the cooler, and a pipe 24 leads from the lower end of the cooler back to the water jacket or pump of the engine. In front of the water cooler the wire fabric 25 is secured.

The front wall of the water cooler is formed as shown in Figs. 4 and 5. The metal plate 21 has drip plates 26 punched from it rearwardly so as to leave openings 27 for air to enter for the purpose of cooling the water. A strong current of air enters, as indicated in Fig. 4, when the automobile is traveling. The drip plates 26 extend inwardly and at a downward inclination, so that water dripping down on them will run rearwardly down over their edges. These plates 26, when punched inwardly, are preferably corrugated, as shown, and are arranged in a staggered position in relation to each other from the top to the bottom of the series.

The water from the water jacket of the engine, while in a warm condition, passes through pipe 23 into a distributing pipe 28 which is perforated and extends laterally in both directions from the pipe 23 in a downwardly inclined direction, as shown in Figs. 2 and 3. From said perforated distributing pipe 28 the water drops down upon the drip plates 26, from one to the other. This effectually distributes the water over the entire cooling device and causes it to go down in drops, and the inrushing air comes in contact with it and cools it before it reaches the bottom. The inrushing air passes out through the air outlets 30 formed in the ends of the water cooler at the sides of the automobile. See Fig. 3. The water drops down onto the bottom 31, which is arranged in an inclined position and is provided with a series of perforations 32, see Fig. 6, near the rear edge, through which the water flows into the collecting chamber 22, and thence it goes back into pipe 24. There is a removable cap 33 at the end of the chamber 22, whereby said chamber can be readily cleaned out. The function of the bottom plate 31 is to prevent the water in chamber 22 from splashing out while the automobile is traveling. The vertical partition portions of front plate 25 which lie between the punched out openings are preferably slightly concave so lateral rocking of the automobile will not splash the water laterally which may be running down said partition portions.

We claim as our invention:

1. A water cooler for engines including a vertically disposed chamber having a front plate provided with openings for the admission of air, drip plates extending rearwardly from said front plate and inclined downwardly therefrom, means for conveying and distributing the water at the upper end of the cooling device so as to drop on said drip plates, and means for conveying the water from the lower end of the device.

2. A water cooler for engines including a vertically disposed chamber having a front plate provided with openings for the admission of air, drip plates punched out of said front plate so as to be integral with the body of the plate at their upper ends extending at a downward inclination therefrom rearwardly, means for conveying and distributing the water at the upper end of the cooling device so as to drop on said drip plates, and means for conveying the water from the lower end of the device.

3. A water cooler for engines including a vertically disposed chamber and having a front plate provided with openings for the admission of air, drip plates punched out of said front plate so as to be integral with said front plate at their upper ends extending at a downward inclination rearwardly and corrugated and said drip plates arranged in staggered position with relation to each other in vertical series, means for conveying and distributing the water at the upper end of the cooling device so as to drop on said drip plates, and means for conveying the water from the lower end of the device.

4. A water cooler for engines including a vertically disposed chamber having a front plate provided with openings for the admission of air, drip plates extending rearwardly from said front plate and inclined downwardly therefrom, a pipe entering the upper end of said water cooler, a transversely extending perforated pipe leading in each direction therefrom at a downward inclination, a plate above the bottom of said water cooling device forming a water chamber below said plate, said plate being inclined downwardly and rearwardly and provided with perforations along its rear edge, and a pipe leading from said water collecting chamber.

In witness whereof, we have hereunto affixed out signatures in the presence of the witnesses herein named.

FRANK CONLY.
WILLIAM A. HAWKINS.

Witnesses:
G. H. BOINK,
O. M. McLAUGHLIN.